United States Patent [19]

Miles

[11] 4,257,045

[45] Mar. 17, 1981

[54] RMS VOLTAGE CONTROL WITH VARIABLE DUTY CYCLE FOR MATCHING DIFFERENT LIQUID CRYSTAL DISPLAY MATERIALS

[75] Inventor: Larry L. Miles, Dallas, Tex.

[73] Assignee: Texas Instruments Incorporated, Dallas, Tex.

[21] Appl. No.: 948,933

[22] Filed: Oct. 5, 1978

[51] Int. Cl.[3] .......................... G06F 3/14; G09F 9/32

[52] U.S. Cl. .................................. 340/784; 340/765; 340/805

[58] Field of Search ...................... 340/765, 784, 805; 350/331, 332, 330

[56] References Cited

U.S. PATENT DOCUMENTS

| | | | |
|---|---|---|---|
| 4,100,540 | 7/1978 | Fujita et al. | 340/805 |
| 4,121,203 | 10/1978 | Edwards et al. | 340/805 |
| 4,122,661 | 10/1978 | Tsuji | 340/805 |
| 4,127,848 | 11/1978 | Shanks | 340/805 |

*Primary Examiner*—Marshall M. Curtis
*Attorney, Agent, or Firm*—William K. McCord; Stephen S. Sadacca; Melvin S. Sharp

[57] ABSTRACT

A method and system for driving a liquid crystal display (LCD) with adjustable drive voltages to match selected ones of a number of different liquid crystal materials utilize variable duty cycle control. Instead of regulating the battery supply voltage to provide desired driving voltage, the driving voltage is disabled for preselected portions of each cycle thereby controlling the root mean square voltage across the LCD segments during both the display-on and display-off states of each display segment to match the liquid crystal material. Two-, three- and four-way multiplexing or any other level of multiplexing may be used in conjunction with this method and system.

18 Claims, 5 Drawing Figures

VOLTAGE ACROSS LCD SEGMENTS

RMS VOLTAGE CONTROL WITH VARIABLE DUTY CYCLE FOR MATCHING DIFFERENT LIQUID CRYSTAL DISPLAY MATERIALS

BACKGROUND OF THE INVENTION

This invention relates to liquid crystal displays and more particularly to methods and systems for controlling the voltages driving liquid crystal displays.

Present-day electronic systems, such as calculators, timepieces, and the like, having multiplexed liquid crystal displays, require a regulated voltage Vp and fractional voltages for driving the segments and backplanes of the liquid crystal display. In prior art multiplexed liquid crystal display systems, voltage driving the display is controlled by means of a device such as a voltage regulator to match the driving voltage with the particular material used in the display. A center tap, for example, between a series of diodes and resistors provides the fractional voltage needed to drive the display. Controlling voltage by means of a regulator and center tap is difficult and results in unwanted consumption of power.

It is therefore an object of the present invention to provide an improved system and method of controlling liquid crystal display drive voltages.

It is another object of the present invention to provide means for lowering the root mean square voltage driving a liquid crystal display to match the particular display material without using a voltage regulator.

It is yet another object of the present invention to provide an improved means for varying the root mean square voltage driving a liquid crystal display with reduced power consumption.

It is a further object of the present invention to provide a means for controlling the root means square voltage driving a liquid crystal display that is suitable for use with a silver oxide battery and doubler system with low power CMOS circuitry.

BRIEF DESCRIPTION OF THE INVENTION

These and other objects are accomplished in accordance with the present invention by providing a means for varying the duty cycle of the voltage driving a liquid crystal display. Liquid crystal displays respond to the root mean square voltage across the display segments. By disabling the drive voltage so that both the segments and backplanes are coupled to the same potential for a predetermined length of time during each cycle of the drive voltage, the root mean square voltage is variable to match the particular display material during both the display on and display off states of each segment.

This method of matching the particular display material by varying the duty cycle may be used with two-, three- or four-way multiplexing, or any other level of multiplexing.

DETAILED DESCRIPTION OF INVENTION

Figure 1:
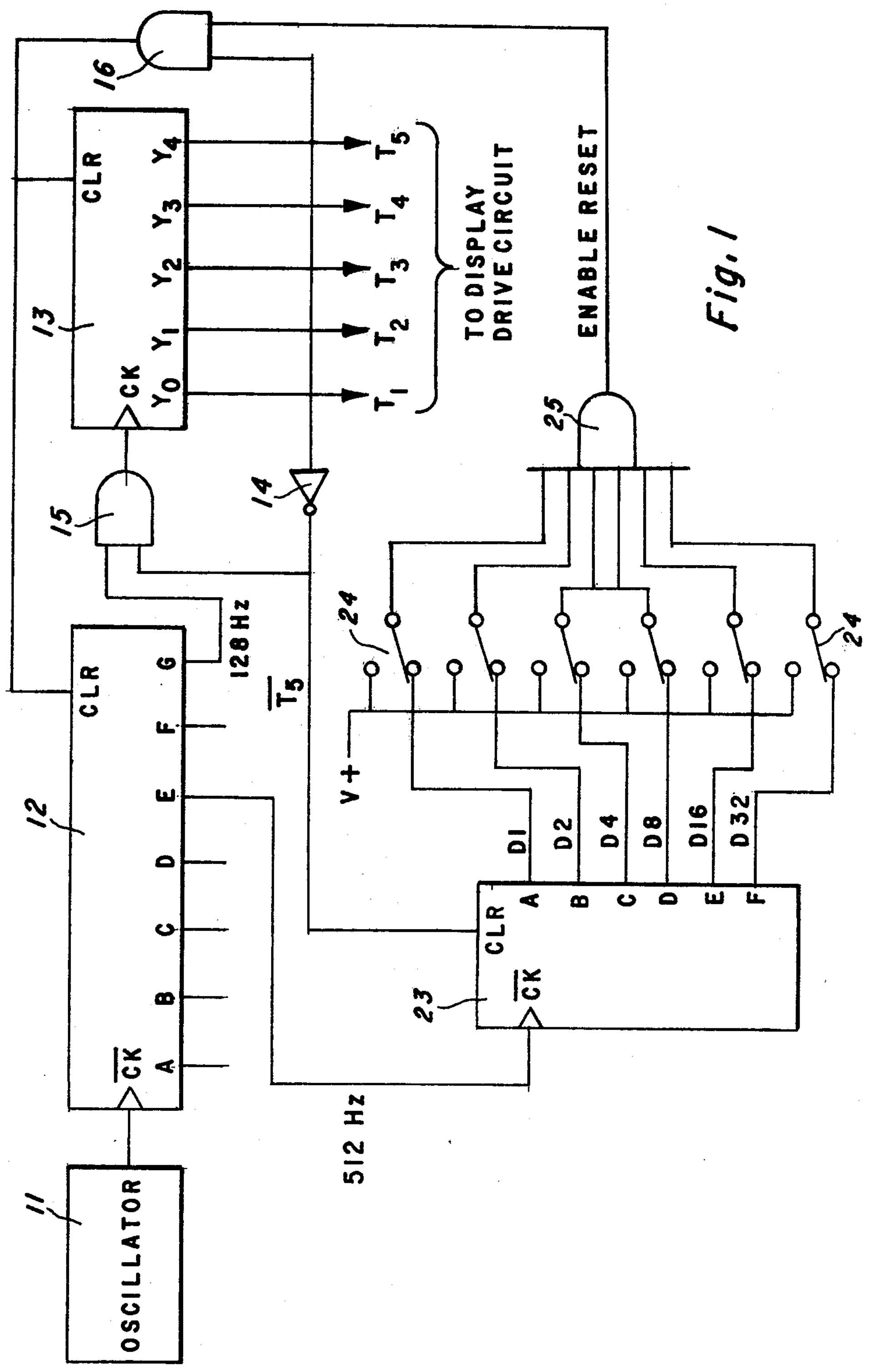
FIG. 1 is a circuit diagram embodying the present invention.

FIG. 1 shows a circuit for controlling the display drive circuit of a liquid crystal display. Countdown chain 12, driven by oscillator 11, generates 128 Hz and 512 Hz clocking signals for the operation of counters 13 and 23, respectively. Counter 13 counts four cycles of the incoming 128 Hz clocking signal and generates a distinct sequence of enabling signals during each cycle. During the first cycle, enabling signal T1 is a logic "1" and enabling signals T2–T4 are logic "0." During the second cycle enabling signal T2 is a "1" and enabling signals T1, T3 and T4 are "0." After the fourth cycle, a disabling signal T5 is a "1" and enabling signals T1–T4 are "0" for a selected period of time as determined by the setting of counter 23. Signals T1–T5 are transmitted to the display drive circuitry (FIG. 2*a*).

When signal T5 is "0," the output of inverter 14 is "1," which enables AND gate 15, thereby allowing 128 Hz clocking signals to go to counter 13. The output of inverter 14 also transmits a continuous clear signal to counter 23. When signal T5 is "1," the output of inverter 14 is "0," thereby disabling the 128 Hz clocking signals and enabling counter 23.

When enabled, counter 23 counts the number of cycles of the 512 Hz clocking signals corresponding to the "off" period during which the voltage driving the display segments is disabled. The closed or open position of each switch in switch group 24 determines the number of cycles counter 23 will count before enabling a reset signal from AND gate 25. When a switch is closed it corresponds to a binary "1" code; when open, it corresponds to a binary "0." All the switches are shown in closed positions in FIG. 1. This corresponds to the binary code 111111, i.e. 63 cycles, which must be counted before AND gate 25 is enabled. In this situation, the voltage driving the segments of the display is disabled for 63 cycles of the 512 Hz clocking signal. If it is desired to disable the driving voltage for only 31 cycles, for example, the switch connecting the D32 binary output of counter 23 is set to an open position. A logic "1" signal would then be continuously transmitted to AND gate 25 in lieu of D32 output signal and a reset signal would be triggered by AND gate 25 when all its other inputs are "1," i.e. when 31 cycles have been counted. The reset signal goes to AND gate 16 which clears counter 13 and disabling signal T5 becomes "0" and disables the clear signal to counter 13. When signal T5 is "0," inverter 14 generates a "1" signal which clears counter 23 and enables the 128 Hz clocking signals. Counter 13 begins its counting cycle again, generating signals T1–T5 in sequence as described above.

Figure 2A:
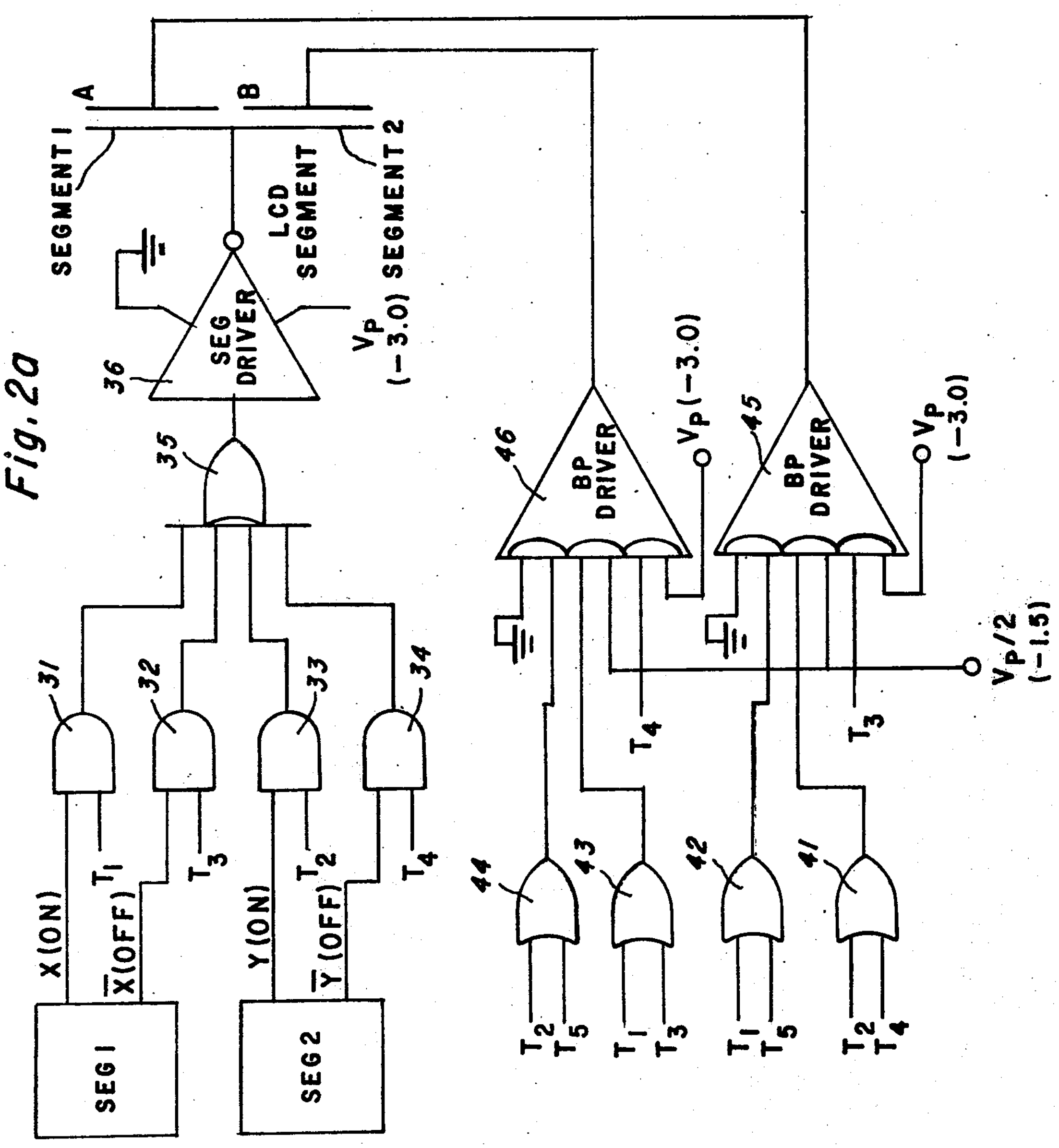
FIG. 2*a* is a circuit diagram of a two-way multiplexed liquid crystal display drive circuitry and drivers controlling the voltage driving the segments.
Figure 2B:
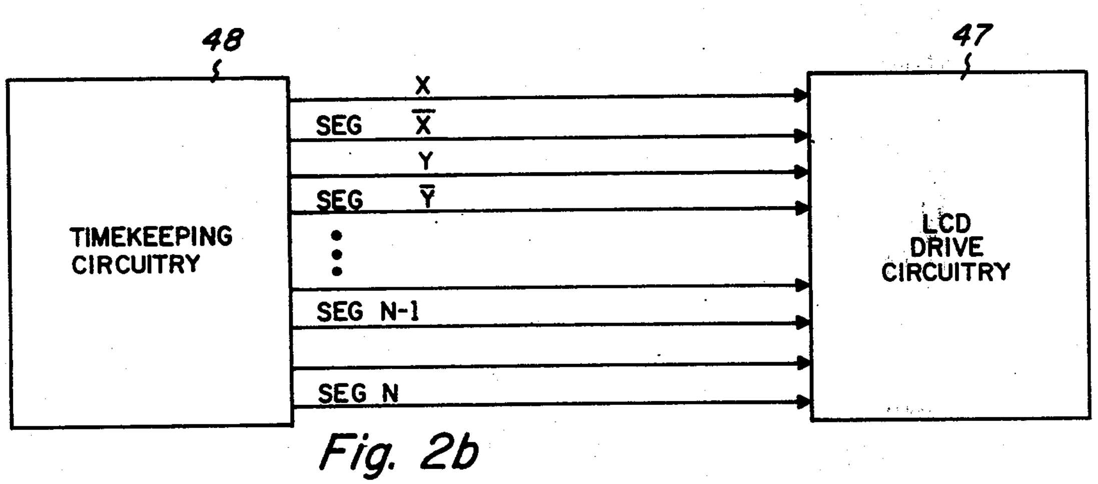
FIG. 2*b* is a block diagram of a timekeeping circuit inputting segment logic signals to a LCD drive circuit.

FIG. 2*a* shows a two-way multiplexed liquid crystal display and drive circuitry with two segments 1, 2 and two backplanes A, B. Segment logic signals X, $\overline{X}$, Y and $\overline{Y}$, corresponding to the on and off states of each segment, function as inputs along with enabling signals T1–T4 to AND gates 31–34. Segment logic signals X, $\overline{X}$, Y, $\overline{Y}$ are data inputs to a LCD drive circuit 47 from a system such as a timekeeping circuit 48 of an electric timepiece as shown in FIG. 2*b*. If segment 1 is on, logic signal X will be "1" or high and $\overline{X}$ will be "0" or low. If segment 1 is off, logic signal X is low and $\overline{X}$ is high.

Figure 3:
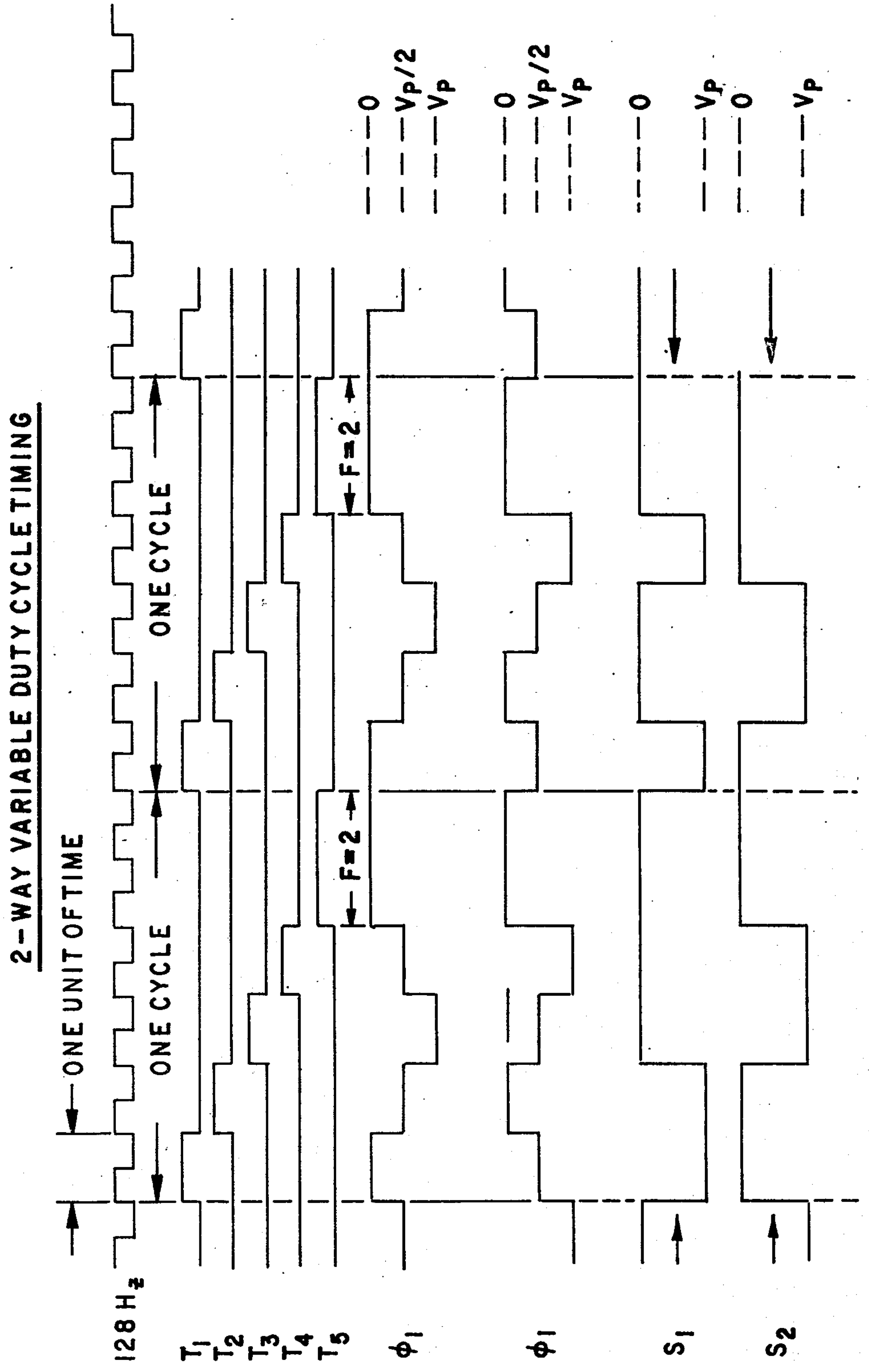
FIG. 3 is an illustration of two-way multiplexed variable duty cycle timing and voltage signals applied to the backplanes and segments of a liquid crystal display.

The arrangement is identical for segment 2. For example, if both segments 1 and 2 are on, the output of OR gate 35 is high during periods when enabling signal T1 or T2 is high and low during periods when enabling signal T3 or T4 is high. Driver 36 generates segment signal S1 as shown in FIG. 3. If both segments 1 and 2 are off the output of OR gate 35 is "1" during periods when enabling signal T3 or T4 is "1" and "0" when enabling signals T1 or T2 is "1." Driver 36 generates segment signal S2 as shown in FIG. 3. Segment signal S3 is generated by driver 36 when segment 1 is on and segment 2 is off. Segment signal S4 is generated when segment 1 is off and segment 2 is on. Segment signals S1–S4 alternate between Vp and ground. When signal T5 is high, the output of OR gate 35 is "0" and both segments 1 and 2 are coupled to ground.

Signals T1–T5 also control backplane drivers 45 and 46, which drive backplanes A and B, respectively. Backplane driver 45 generates backplane signal $\phi 1$ and backplane driver 46 generates backplane signal $\phi 2$. Backplane signals $\phi 1$ and $\phi 2$ alternate between Vp, Vp/2 and ground. When signal T5 is high the outputs of OR gates 42 and 44 are high and the outputs of OR gates 41 and 43 are low. Backplanes A and B are coupled to ground as are segments 1 and 2. Thus the voltage across each segment, i.e. the driving voltage, is zero when signal T5 is high.

Figure 4:
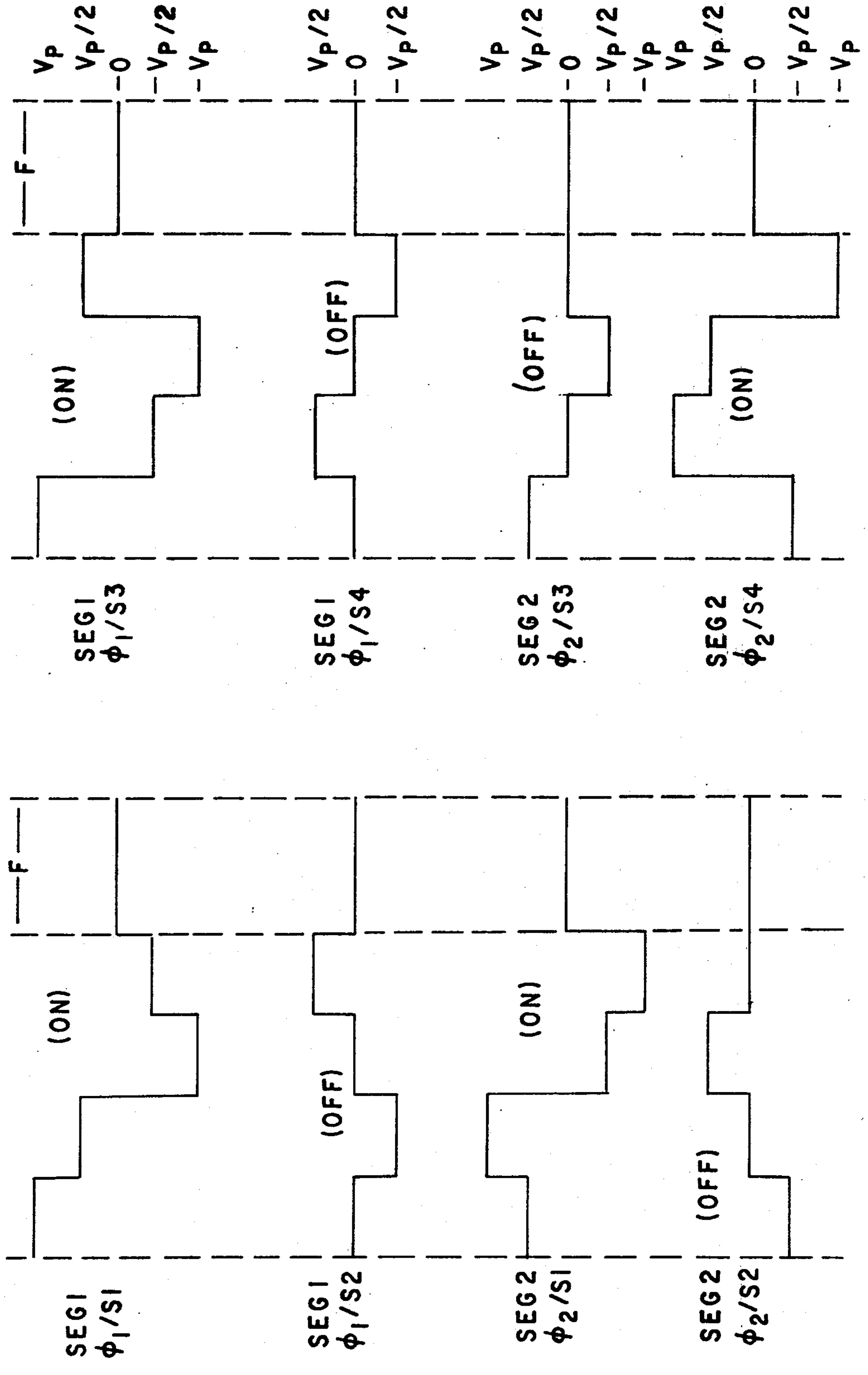
FIG. 4 is an illustration of the various voltage signals across the display segments.

Period F, during which the drive voltage is disabled, occurs during every cycle of the drive voltage. In FIG. 3, period F is chosen to be two units of time or two cycles of the 128 Hz clocking signals. FIG. 4 shows the drive voltage signals across segments 1 and 2 for various on and off states of the segments. Liquid crystal display segments are responsive to the root mean square voltage across the segments. As period F increases, the root mean square voltage driving each segment in both the on and off states decreases. Root mean square voltage, Vrms, can be expressed as follows:

$$Vrms\text{ (segment on)} = \sqrt{\frac{Vp^2 + (\frac{1}{2}\,Vp)^2}{2 + F/2}}$$

Where $F$ = number of cycles of the 128Hz clock signals during which drive voltage is disabled $$Vrms\text{ (segment off)} = \sqrt{\frac{(\frac{1}{2}\,Vp)^2}{2 + F/2}}$$

For two-way multiplexing Vrms (on)/Vrms (off)=2.24, a constant independent of F.

Period F may be fixed by hardwiring counter 23 or variable by making counter 23 externally programmable. By varying period F, Vrms can be varied to match the particular display material being used without the need for a voltage regulator, thereby reducing power consumption and enhancing voltage control. This system for and method of varying the duty cycle of the drive voltage may be employed in LCD systems such as electronic timepieces and are particularly well-suited to low power CMOS circuitry and for use with a silver oxide battery and doubler circuitry or similar LCD power system. It can be used to control voltages driving three way or higher levels of multiplexed displays as well as non-multiplexed displays.

Since it is obvious that many changes and modifications can be made in the above details without departing from the nature and spirit of the invention, it is understood that the invention is not to be limited to said details except as set forth in the appended claims.

What is claimed is:

1. A liquid crystal display system, responsive to a plurality of segment logic signals for displaying information on a display thereof, said segment logic signals representing the on/off states of each of a plurality of activatable segments in said display, said display system comprising:

(a) display drive means for applying drive voltage to the display, said drive means for applying a first set of voltage signals to a plurality of backplanes in said display and a second set of voltage signals to the plurality of segments in said display, said drive means being responsive to said segment logic signals for applying said second set of voltage signals; and (b) counting means for counting a predetermined number of first time intervals in succession and a second time interval after said first time intervals during each cycle of said drive voltage, said second time interval being selected according to the liquid crystal material and generating one of a plurality of enabling signals during each of said first time intervals and a disabling signal during said second time interval, each enabling signal triggering said drive means to apply a selected one of said first set of voltage signals to each backplane and a selected one of said second set of voltage signals to said segments in accordance with said segment logic signals, said disabling signal triggering said drive means to apply the same voltage to each backplane and segment, thereby disabling the drive voltage across each segment during said second time interval to adjust the root mean square drive voltage to match said liquid crystal material.

2. The system according to claim 1 wherein said counting means comprises:

(i) first counting means for counting said first time intervals and for generating selected ones of said enabling signals during said first time intervals and said disabling signal during said second time interval, and (ii) second counting means for counting said second time interval and generating a reset signal to said first counting means at the end of said second time interval, said first counting means being disabled from counting during said second time interval.

3. The system according to claim 2 wherein said first and second counting means are comprised of binary counters.

4. The system according to claim 2 wherein said second counting means is externally programmable via manually settable switch means to vary the length of said second time interval in accordance with the liquid crystal material used.

5. The display system according to claim 1 wherein said liquid crystal display is a multiplexed display.

6. The display system according to claim 5 wherein the voltage applied to said backplanes alternates between a predetermined voltage, one-half said predetermined voltage and ground.

7. The display system according to claim 5 wherein the voltage applied to said plurality of segments alternates between said predetermined voltage and ground.

8. The display system according to claim 1 wherein said drive means comprises:

(i) a plurality of first driver means for applying said first set of voltage signals to said plurality of backplanes, and (ii) a plurality of second driver means for applying said second set of voltage signals to said plurality of segments.

9. A method of controlling the root mean square of the drive voltage of a liquid crystal display to match the liquid crystal material by varying the duty cycle of the drive voltage, said display having a drive means responsive to a plurality of segment logic signals for applying selected voltage signals to a plurality of backplanes and segments in said display system, said logic signals representing the on/off display states of said segments, said method comprising the following steps:

(a) counting a predetermined number of first time intervals in succession during each cycle of the display drive voltage;

(b) generating one of a plurality of enabling signals during each of said first time intervals so that said drive means applies selected voltage signals to each of said plurality of backplanes and segments in accordance with said enabling signals and said segment logic signals; and (c) periodically generating a disabling signal during a second time interval after said first time intervals, selected according to the liquid crystal material used, during each cycle of said drive voltage so that the same voltage is applied to each of said plurality of backplanes and segments during said second time interval, thereby disabling the drive voltage across each segment during said second time interval to adjust the root mean square drive voltage to match said liquid crystal material.

10. A system for controlling the root mean square drive voltage of a multiplexed liquid crystal display to match the liquid crystal material used, said display having a drive means for applying a first set of selected voltage signals to a plurality of backplanes in said display system and a second set of selected voltage signals to a plurality of activatable segments within said display system, said drive means being responsive to a plurality of segment logic signals representing the on/off states of each segment for applying said second set of voltage signals, said system comprising:

(a) first counting means for counting a predetermined number of first time intervals in succession during each cycle of said drive voltage and generating one of a plurality of enabling signals during each of said first time intervals, each of said enabling signals triggering said drive means to apply a selected one of said first set and a selected one of said second set of voltage signals to each of said backplanes and segments, respectively;

(b) second counting means for counting a second time interval after said first time intervals, selected according to the liquid crystal material used, during each cycle of said drive voltage, and for generating a reset signal to said first counting means at the end of said second time interval, said first counting means being disabled from counting during said second time interval; and (c) means for generating a disabling signal during said second time interval, said drive means being responsive to said disabling signal for applying the same voltage to each of said backplanes and each of said segments, thereby disabling the drive voltage across each segment during said second time interval to adjust the root mean square drive voltage to match said liquid crystal material.

11. The system according to claim 10 wherein said first and second counting means are comprised of binary counters.

12. The system according to claim 10 wherein said second counting means is externally programmable via manually settable switch means to vary the length of said second time interval in accordance with the liquid crystal material used.

13. The system according to claim 10 wherein the voltage applied to said backplanes alternates between a predetermined voltage, one-half said predetermined voltage and ground.

14. The system according to claim 10 wherein the voltage applied to said plurality of segments alternates between said predetermined voltage and ground.

15. An electronic timepiece having a plurality of time functions, comprising:

(a) clocking circuit means for generating a plurality of logic signals representing time-related information; and (b) a liquid crystal display system responsive to said logic signals for displaying said time-related information on a display thereof, said logic signals representing the on/off states of each of a plurality of activatable segments in said display, said display system comprising:

(i) display drive means for applying drive voltage to the display, said drive means for applying a first set of voltage signals to a plurality of backplanes in said display and a second set of voltage signals to the plurality of segments in said display, said drive means being responsive to said segment logic signals for applying said second set of voltage signals; and (ii) counting means for counting a predetermined number of first time intervals in succession and a second time interval after said first time intervals during each cycle of said drive voltage, said second time interval being selected according to the liquid crystal material and generating one of a plurality of enabling signals during each of said first time intervals and a disabling signal during said second time interval, each enabling signal triggering said drive means to apply a selected one of said first set of voltage signals to each backplane and a selected one of said second set of voltage signals to said segments in accordance with said segment logic signals, said disabling signal triggering said drive means to apply the same voltage to each backplane and segment, thereby disabling the drive voltage across each segment during said time interval to adjust the root mean square drive voltage to match said liquid crystal material.

16. The electronic timepiece according to claim 15 wherein said clocking circuit means includes an oscillator, a count down chain and at least one counting means.

17. The electronic timepiece according to claim 15 wherein said counting means comprises:

(i) first counting means for counting said first time intervals and for generating selected ones of said enabling signals during said first time intervals and said disabling signal during said second time interval, and (ii) second counting means for counting said second time interval and generating a reset signal to said first counting means at the end of said second time interval, said first counting means being disabled from counting during said second time interval.

18. The electronic timepiece according to claim 17 wherein said first and second counting means are a subset of said clocking circuit means.

* * * * *